US011546840B2

(12) United States Patent
Baek et al.

(10) Patent No.: US 11,546,840 B2
(45) Date of Patent: Jan. 3, 2023

(54) METHOD AND APPARATUS FOR DISCOVERING AND SELECTING PRIVATE CELLULAR NETWORK BY TERMINAL

(71) Applicant: Samsung Electronics Co., Ltd., Gyeonggi-do (KR)

(72) Inventors: Youngkyo Baek, Gyeonggi-do (KR); Sangjun Moon, Gyeonggi-do (KR); Jungshin Park, Gyeonggi-do (KR); Jicheol Lee, Gyeonggi-do (KR)

(73) Assignee: Samsung Electronics Co., Ltd ( * ) Notice: Subject to any disclaimer, the term of this patent is extended or adjusted under 35 U.S.C. 154(b) by 87 days.

(21) Appl. No.: 17/260,384

(22) PCT Filed: Aug. 7, 2019

(86) PCT No.: PCT/KR2019/009918
§ 371 (c)(1),
(2) Date: Jan. 14, 2021

(87) PCT Pub. No.: WO2020/036364
PCT Pub. Date: Feb. 20, 2020

(65) Prior Publication Data
US 2021/0297937 A1 Sep. 23, 2021

(30) Foreign Application Priority Data

Aug. 13, 2018 (KR) .................. 10-2018-0094370
Sep. 21, 2018 (KR) .................. 10-2018-0113944
(Continued)

(51) Int. Cl.
H04W 48/16 (2009.01)
H04W 76/11 (2018.01)
(Continued)

(52) U.S. Cl.
CPC ........... *H04W 48/16* (2013.01); *H04W 48/12* (2013.01); *H04W 76/11* (2018.02); *H04W 84/042* (2013.01)

(58) Field of Classification Search
CPC ..... H04W 48/16; H04W 48/12; H04W 76/11; H04W 84/042; H04W 48/18; H04W 48/02
See application file for complete search history.

(56) References Cited

U.S. PATENT DOCUMENTS 8,571,550 B2    10/2013  Hom et al.
9,332,480 B2     5/2016  Griot et al.
(Continued)

FOREIGN PATENT DOCUMENTS

KR    1020110126139    11/2011
KR    1020130086587     8/2013
(Continued)

OTHER PUBLICATIONS

PCT/ISA/210 Search Report issued on PCT/KR2019/009918, dated Nov. 15, 2019, pp. 5.
PCT/ISA/237 Written Opinion issued on PCT/KR2019/009918, dated Nov. 15, 2019, pp. 6.
(Continued)

*Primary Examiner* — Diane D Mizrahi
(74) *Attorney, Agent, or Firm* — The Farrell Law Firm, P.C.

(57) ABSTRACT

The present disclosure relates to a communication technique for convergence of an IoT technology and a 5G communication system for supporting a higher data transmission rate beyond a 4G system, and a system therefor. The present disclosure may be applied to intelligent services (for example, smart homes, smart buildings, smart cities, smart cars or connected cars, healthcare, digital education, retail business, security and safety-related services, etc.) on the
(Continued)

basis of a 5G communication technology and IoT-related technology. The present invention provides a method and an apparatus for discovering and selecting a private network by a terminal.

17 Claims, 10 Drawing Sheets

(30) Foreign Application Priority Data

Jan. 8, 2019 (KR) .......................... 10-2019-0002356
Apr. 25, 2019 (KR) .......................... 10-2019-0048587

(51) Int. Cl.
*H04W 48/12* (2009.01)
*H04W 84/04* (2009.01)

(56) References Cited

U.S. PATENT DOCUMENTS

2015/0141007 A1   5/2015  Du et al.
2015/0208327 A1*  7/2015  Baratam ............... H04W 48/16
                                                          455/432.1

FOREIGN PATENT DOCUMENTS

| KR | 1020160125516 | 10/2016 |
|----|---------------|---------|
| KR | 101877822     | 7/2018  |

OTHER PUBLICATIONS

3GPP; Technical Specification Group Services and System Aspects; Study on 5GS Enhanced support of Vertical and LAN Services; (Release 16), . . .
3GPP TR 23.734 V0.1.0, Jul. 18, 2018, pp. 14.

* cited by examiner

METHOD AND APPARATUS FOR DISCOVERING AND SELECTING PRIVATE CELLULAR NETWORK BY TERMINAL

PRIORITY

This application is a National Phase Entry of PCT International Application No. PCT/KR2019/009918 which was filed on Aug. 7, 2019, and claims priority to Korean Patent Application Nos. 10-2018-0094370, 10-2018-0113944, 10-2019-0002356, and 10-2019-0048587, which were filed on Aug. 13, 2018, Sep. 21, 2018, Jan. 8, 2019, and Apr. 25, 2019, respectively, the content of each of which is incorporated herein by reference.

TECHNICAL FIELD

The disclosure relates to a cellular communication system and, more particularly, to a method and an apparatus for discovering and selecting a private cellular network by a terminal.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In order to locally operate a private communication network for providing a communication service in a smart factory, for example, it is considered to operate a private cellular network (or a private network) that is locally configured separate from a normal public cellular network (or a public network). In this case, in order for a terminal to use the private cellular network by accessing the private cellular network and registering therein, the terminal first needs to be able to discover and select the private communication network. To this end, a scheme for identifying the private communication network is necessary.

DISCLOSURE OF INVENTION

Technical Problem

Private cellular networks are classified, according to the operating scheme, into Type-A private cellular networks which are operated by public cellular network operators so as to interwork with public cellular networks, and Type-B cellular networks which are private cellular networks operated autonomously or independently of public cellular networks. The method for discovering and selecting a network by a terminal may vary depending on the type of the private cellular network. Hereinafter, a scheme for identifying each private cellular network is proposed accordingly, and a scheme for discovering and selecting a private cellular network by a terminal is also proposed. Moreover, a scheme for limiting access of terminals that use a normal public cellular network to the private cellular network is proposed together.

Hereinafter, "private cellular network" will be used interchangeably with "private network" or "non-public network (NPN)" if necessary, and "private network ID" and "non-public network ID" will also be used interchangeably. In addition, "Type-A cellular network" will be used interchangeably with "public network integrated non-public network (PNI NPN)", and "Type-B cellular network" will be used interchangeably with "standalone non-public network".

Solution to Problem

A method of a base station according to an embodiment for solving the above-mentioned problems includes the operations of: generating a system information block (SIB) including first information related to the public land mobile network (PLMN) ID (identity) of a public network, second information for identifying a private network, and third information for controlling access of a terminal to the private network; and transmitting the system information block to the terminal.

A base station according to an embodiment for solving the above-mentioned problems includes: a transceiver configured to transmit and receive a signal; and a controller configured to generate a system information block (SIB) including first information related to the public land mobile network (PLMN) ID (identity) of a public network, second information for identifying a private network, and third information for controlling access of a terminal to the private network, and transmit the system information block to the terminal.

A method of a terminal according to an embodiment for solving the above-mentioned problems includes the operations of: receiving a system information block (SIB) from a base station; and identifying first information related to the public land mobile network (PLMN) ID (identity) of a public network included in the system information, second information for identifying a private network, and third information for controlling access of a terminal to the private network.

A method of a terminal according to an embodiment for solving the above-mentioned problems includes: a transceiver configured to transmit and receive a signal; and a controller configured to receive a system information block (SIB) from a base station, and identify first information related to the public land mobile network (PLMN) ID (identity) of a public network included in the system information, second information for identifying a private network, and third information for controlling access of a terminal to the private network.

Advantageous Effects of Invention

According to a conventional scheme, in the case of using a communication service through a public cellular network, a terminal identifies the cellular network by using a mobile country code (MCC) value and a mobile network code (MNC) value or a public land mobile network (PLMN) ID. However, in the case of Type-A private cellular network, not only information regarding an interworking public cellular network, but also additional information regarding the ID of a private cellular network allocated by the corresponding operator, for example, are necessary for the terminal to identify the network. In the case of Type-B private cellular network, which is operated separately from a public cellular network, no identifier regarding the public cellular network operator is necessary to identify the network, but additional information may be necessary depending on the regulation policy in each region. Hereinafter, a method for identifying Type-A and Type-B private cellular networks described above is proposed, a scheme for enabling terminals to discover a private cellular network and accessing the discovered private cellular network thereby is proposed, and access of terminals that attempt to access a normal public cellular network is controlled. This is advantageous in that waste of communication resources in the private cellular networks is prevented, and stable operation of the private cellular networks is guaranteed.

MODE FOR THE INVENTION

Figure 1:
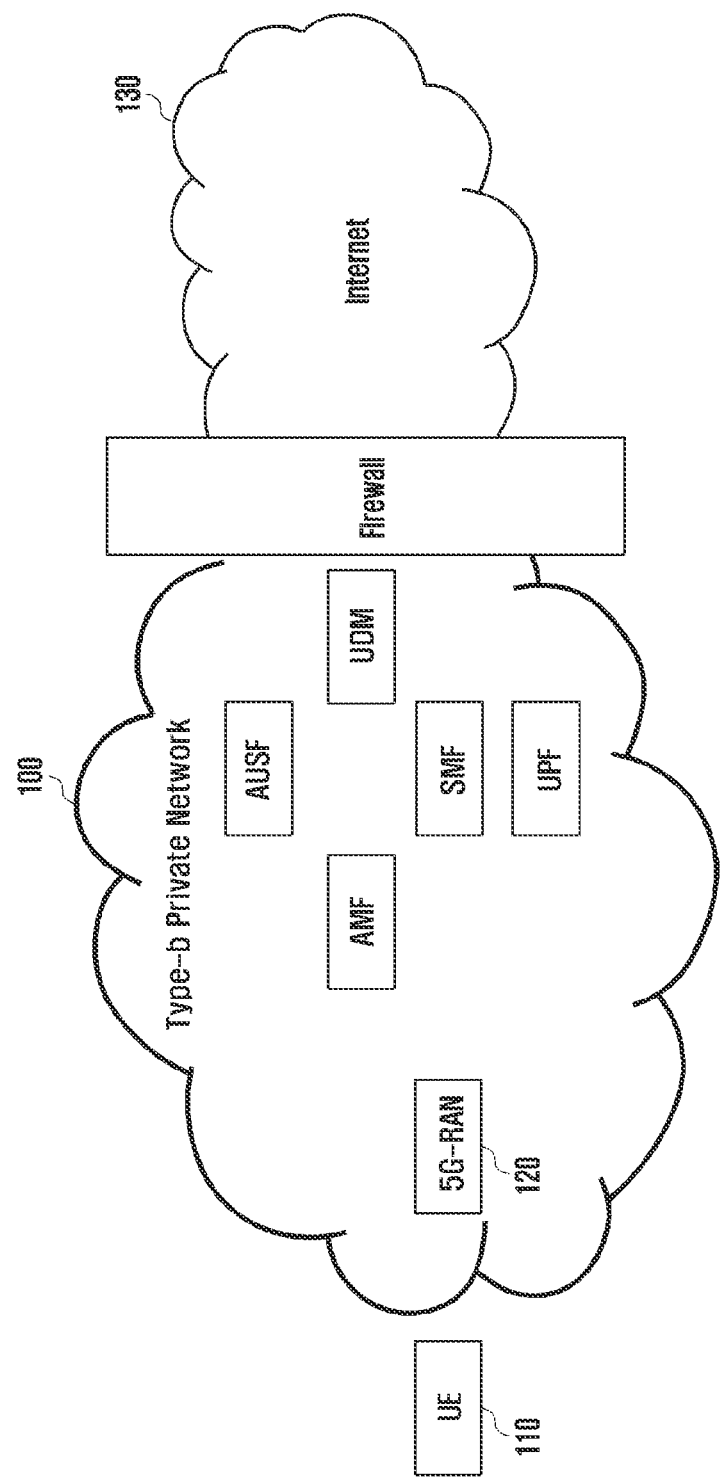
FIG. 1 is a view illustrating a structure of a private network of Type B in connection with a proposed embodiment.

Hereinafter, exemplary embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

FIG. 1 is a view illustrating a structure of a private network of Type B in connection with a proposed embodiment.

Referring to FIG. 1, the structure of the private network 100 of Type B is the same as the structure of the public cellular network. That is, a terminal 110 accesses the 5G core network through 3GPP access, that is, the 5G RAN 120, and the core network includes entities such as access management function (AMF) in charge of mobility management and registration management of the terminal, authentication server function (AUSF) in charge of authentication of the terminal, user data management (UDM) that manages subscription, session management function (SMF) in charge of session management, and user plane function (UPF) that forwards user data. Therefore, for the private network of the Type B, a method different from that in the public cellular network, may be used in the identity of the terminal and the authentication method for the terminal.

In addition, connection to the external Internet network 130 may be possible depending on the private network, and a firewall may be installed to provide safety from external access.

Figure 2:
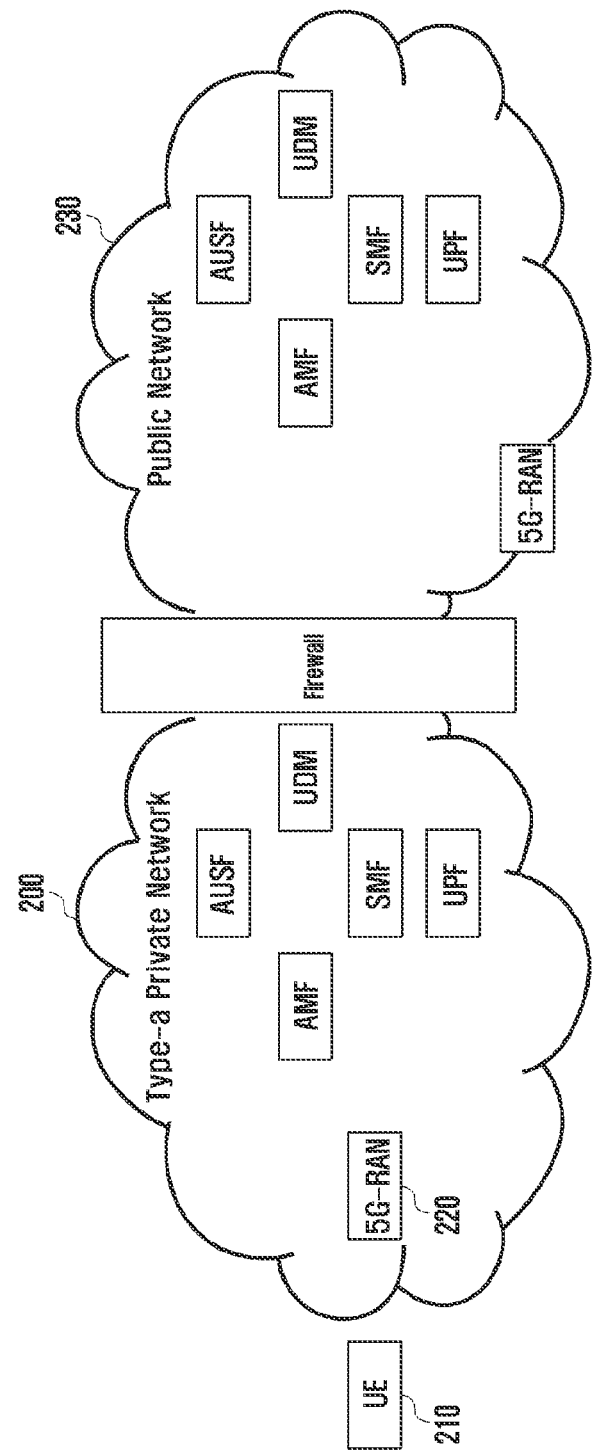
FIG. 2 is a view illustrating a structure of a private network of Type A in connection with a proposed embodiment.

FIG. 2 is a view illustrating a structure of a private network of Type A in connection with a proposed embodiment.

Referring to FIG. 2, the structure of the private network 200 of Type A is a structure interworking with a public cellular network 230, and is a case where the private network and the public cellular network are managed by the same communication service provider. That is, a terminal 210 accesses the 5G core network through 3GPP access, that is, the 5G RAN 220, and the core network may include the same entities as the public cellular network such as AMF in charge of mobility management and registration management of a terminal, AUSF in charge of authentication of the terminal, UDM that manages subscription, SMF in charge of session management, and UPF that forwards user data. In addition, since the private cellular network 200 is interlocked with a public cellular network 230, the private cellular network and the public cellular network may be interlocked like a roaming network. Accordingly, when a terminal accessing the private cellular network 200 is subscribed to the public cellular network 230, an identity for the terminal and an authentication method for the terminal may be used in the same manner as the public cellular network. Of course, a separate terminal identity and a separate authentication method may be used.

On the other hand, when the terminal 210 accessing the private cellular network 200 is not subscribed to the public cellular network 230, as in the case of the private network of Type B of FIG. 1, a separate identity for the terminal and a separate authentication method for the terminal are used.

Figure 3:
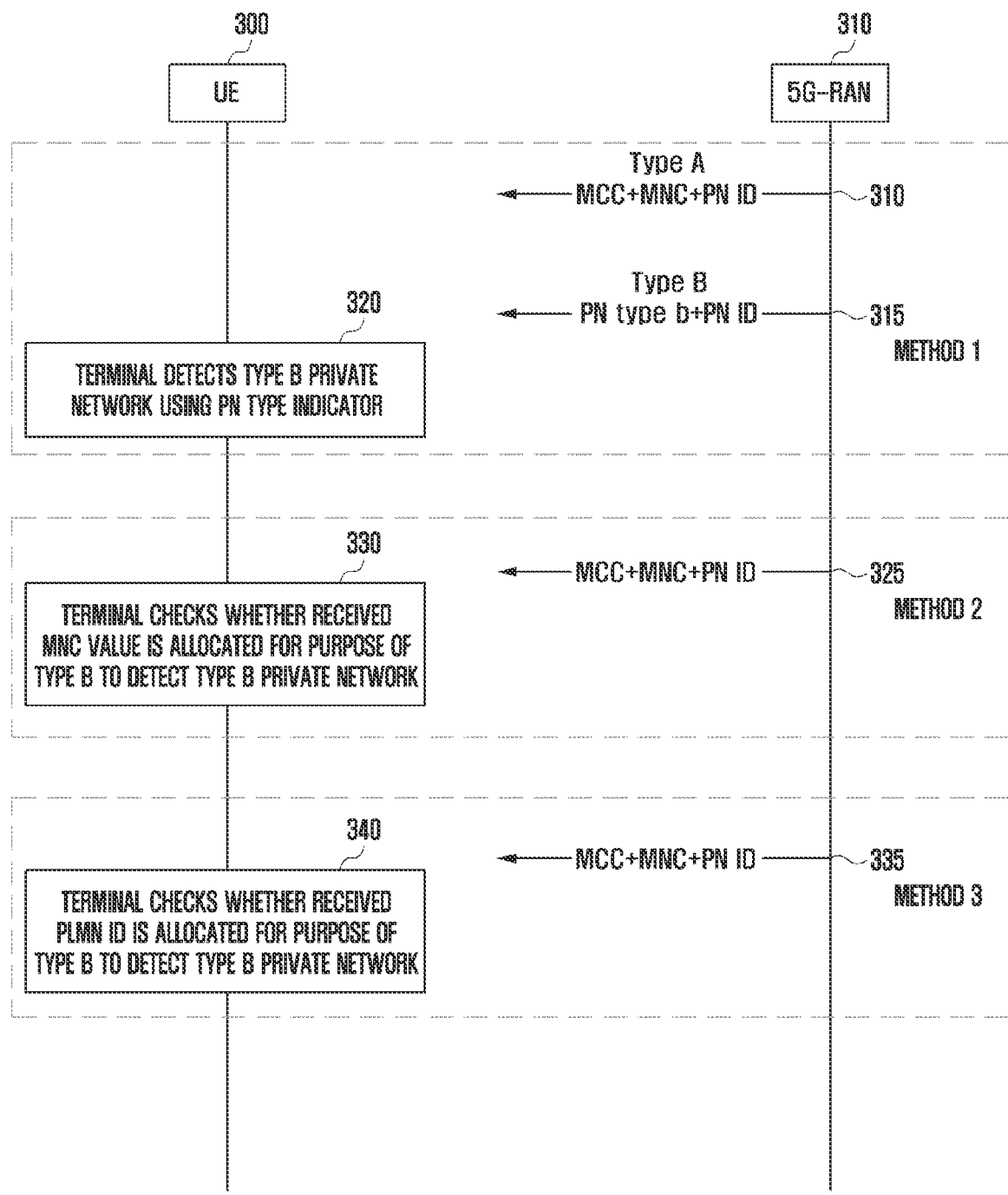
FIG. 3 is a view illustrating an identification scheme for a private network in connection with a proposed embodiment.

FIG. 3 is a view illustrating an identification method of a terminal for a private cellular network according to a proposed embodiment.

A 5G-RAN 310 broadcasts identification information on the private cellular network that it is serving through a system information block (SIB) message or the like. For example, the 5G-RAN (or base station) 310 delivers the identification number for the private cellular network through the SIB #1 message. A terminal 300 may receive the identification information on the private cellular network from the SIB #1 message and identify whether it is a private cellular network to be selected.

As an embodiment of the identification method, as information on the operator network corresponding to the case where the private cellular network is Type A, a PLMN ID (i.e., MCC and MNC) and a private network ID, which is an identifier of a private network allocated by the operator, may be used as identification information (310). In this case, the 5G-RAN may additionally include a private usage indicator indicating that the SIB #1 is used for a private network or a private network Type A indicator indicating that the private network is Type A. On the other hand, when the private cellular network is Type B, a private network ID of the private network identifier randomly allocated by a private cellular network operator or allocated from local regulation may be used as identification information along with a private network Type B indicator indicating that it is a private network of Type B (315). Meanwhile, when the terminal 300 receives a private usage indicator or a private network Type A indicator from information broadcast through the SIB message, or receives a private network ID along with a PLMN ID, the terminal 300 may recognize that the 5G-RAN is a private cellular network of Type A. In addition, the terminal identifies the private cellular network of Type B serviced by the 5G-RAN through the PLMN ID+private network ID (320).

As another embodiment of the identification method, the 5G-RAN may use MCC information, MNC information, and private network ID of a private network as identification information of a private cellular network (325).

In this embodiment, the local regulator in the region corresponding to the MCC allocates a specific MNC value as a value representing a private network for type B purposes, and does not allocate the same to a general public cellular network operator.

For example, in Korea where MCC='450', MNC='000' can be allocated as a value for a private network for type B purposes. In addition, the private network ID arbitrarily set by a private network administrator or a private network ID allocated from the local regulator may be used as identification information of the private network for type B purposes. In this embodiment, the terminal 300 may identify the private cellular network of Type B by checking whether the received MNC value is allocated to the private cellular network of Type B (330).

Here, the local regulator may classify and allocate several values an MNC value for type B purposes according to the purpose of the private network, and not allocate the values to a general public cellular network operator.

As another embodiment of the identification method, a specific MCC value or MNC value not allocated to a general public cellular network operator may be determined regardless of the location, and used as an indication indicating a private network for type B use. For example, when the MCC value is configured as 999, the terminal 300 may use MCC=999 as an indication for a standalone non-public network by recognizing that the cellular network is a type B private network, that is, a standalone non-public network. The MNC value may be arbitrarily configured by a private network operator, or a value configured by a local regulator or standard for a standalone non-public network, or a value derived through a private network ID may be used. For example, a partial value of the private network ID or a hash value of the private network ID may be configured as the MNC value. In this case, the private cellular network may use a combination of the PLMN ID information allocated for the private network purpose and the private network ID of the private network as identification information for the private network (335). The terminal may identify a type B private cellular network by checking whether the received PLMN ID is allocated for type B use (340).

In the case of Type A, the 5G_RAN may use the information PLMN ID (i.e., MCC and MNC) of the corresponding operator network and the private network ID of the private network allocated by the operator as identification information.

Meanwhile, in the case of broadcasting identification information on a private network through a SIB message in this embodiment and the following embodiments, the PLMN ID, that is, the SIB message carrying the MCC value and the MNC value and the SIB message carrying the private network ID may be the same SIB message. Alternatively, the PLMN ID, that is, the SIB message carrying the MCC value and the MNC value, and the SIB message carrying the private network ID may be delivered through different SIB messages.

Meanwhile, the terminal receives the MCC and MNC values from the information broadcast through the SIB message and identifies whether the MNC values are pre-allocated for Type B use in the country using the MCC (330), determines whether the received MCC value or MNC value is a value pre-allocated for type B use (340) and determine whether it is a type A private network or a type B private network, and identifies the private cellular network served by the 5G-RAN through the MCC+MNC+private network ID (330, 340).

In addition, when the received MCC value is 999, the terminal recognizes that it is for type B, and the terminal identifies the private cellular network through the MNC value or private network ID.

The terminal that has identified the type of the private network through the identification procedure determines the user's ID and network authentication method to be used in the future private network registration step.

Figure 4:
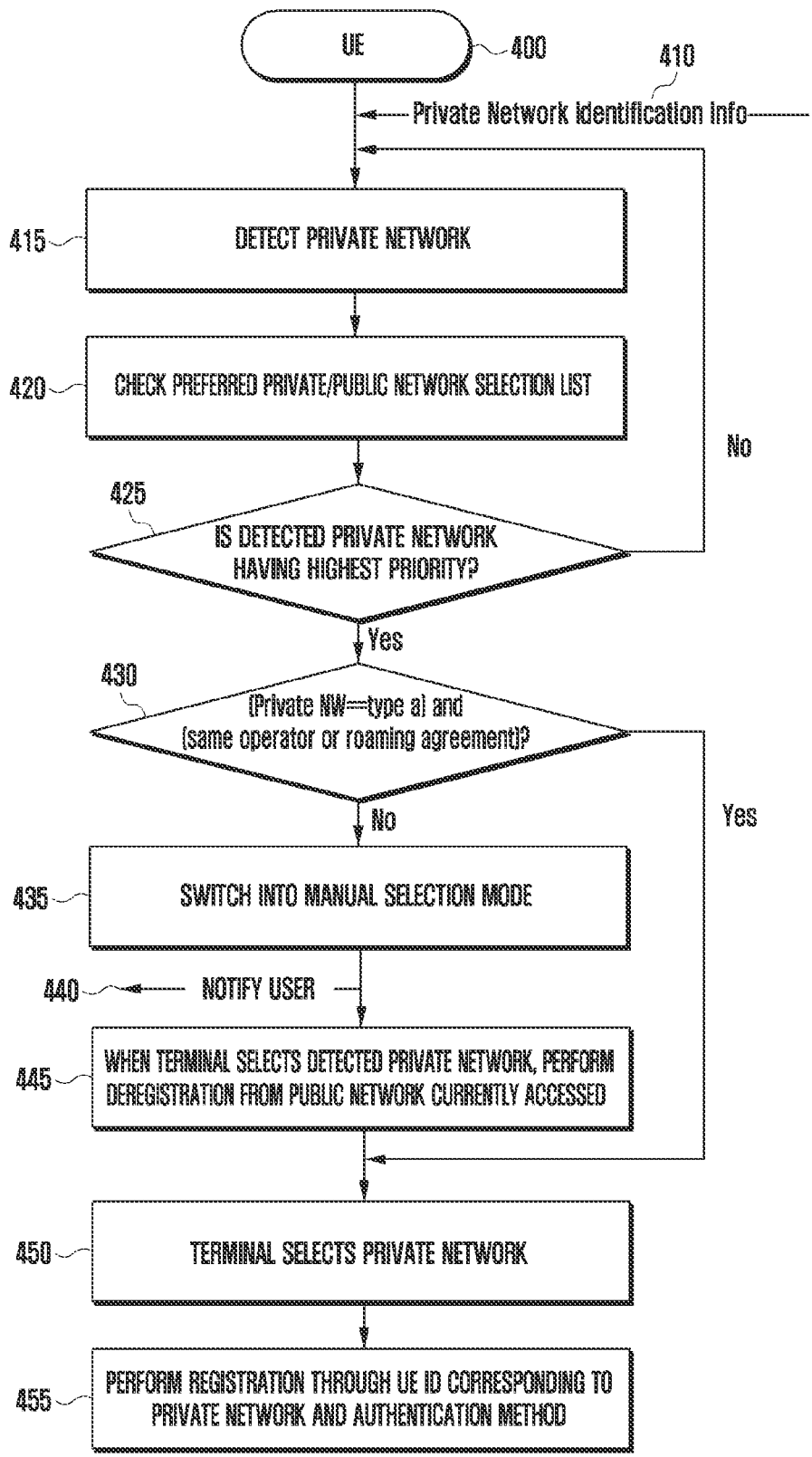
FIG. 4 is a view illustrating an operation of a terminal for discovering a private network and selecting a corresponding private network in connection with a proposed embodiment.

FIG. 4 is a view illustrating an operation sequence of a terminal for discovering a private network and selecting a corresponding private network in connection with a proposed embodiment.

A 5G-RAN of the private cellular network broadcasts identification information on the private cellular network that it is servicing through a system information block (SIB) message, and the like, and the terminal receives the identification information (410).

The terminal that has received the identification information may identify the private network through the method of the embodiment described in FIG. 3 (415). The terminal knows whether or not the private network can be used through the identification information of the subscribed private network (e.g. MCC+MNC+private network ID) stored in secure storage for universal subscriber identification module (USIM) or private network (NW). When a private network is available and in the automatic selection mode, the terminal determines whether to select a corresponding private network by identifying a preferred private & public network selection list stored in secure storage for USIM or private NW (420). In this case, the preferred private & public network selection list is a list indicating the priority of selection for a specific network among the available private and public cellular networks discovered by the terminal, and if the found private network has the highest priority among available private networks and public networks, the terminal operates to select a private network with the highest priority (425).

When the found private network has the highest priority, the terminal changes a method of accessing the private network according to the type of the private network.

That is, if the private network is in Type A, the terminal determines whether the terminal is subscribed to the public cellular network managing the private network so that the terminal can access, or whether the terminal is subscribed to the public cellular network that has a roaming agreement with the public cellular network managing the private network (430). If the terminal is subscribed to the above public cellular network or subscribe to a public cellular network with a roaming agreement, or is allocated UE ID (e.g., subscriber permanent identifier (SUPI)) issued by a public cellular network with a roaming agreement, the terminal may select the private network and the terminal may register as a private network. In this case, the terminal may register in the private network using a UE ID, for example, SUPI or subscription concealed identifier (SUCI) allocated by the public cellular network to which it is subscribed.

On the other hand, when the terminal is unable to access the public cellular network that has subscribed or issued a UE ID (e.g., SUPI) through the private network, such as when the private network is in Type B, or when the private network is Type A and the terminal is not subscribed to the public cellular network that manages the private network, or there is no roaming agreement with the public cellular network to which the terminal subscribes, etc., the terminal may select the private network or switch to a manual selection mode to determine whether to select the private network based on values or information configured by the user or the user (435).

Meanwhile, when the terminal is currently receiving a service by accessing the public cellular network, the terminal may warn the user that the service may be stopped due to the selection of the private network (440). When the terminal selects the private network by the user, the terminal may perform deregistration from the public cellular network when it is previously registered in the public cellular network (445). When the terminal performs registration in the private network (450), the terminal may perform registration in the private network using a private network UE ID, which is a subscriber ID allocated for a private cellular network subscriber (455).

Alternatively, instead of the private network UE ID, the terminal may use the SUPI value, which is a subscriber ID allocated from the subscribed public cellular network, without encryption. In addition, when the terminal joins the private cellular network, the SUPI value, which is a subscriber ID allocated from the public cellular network to which the terminal is subscribed, is encrypted according to an encryption rule shared between the terminal and the private cellular network to use as the ID of the terminal and registration may be performed on a private network (455).

Figure 5:
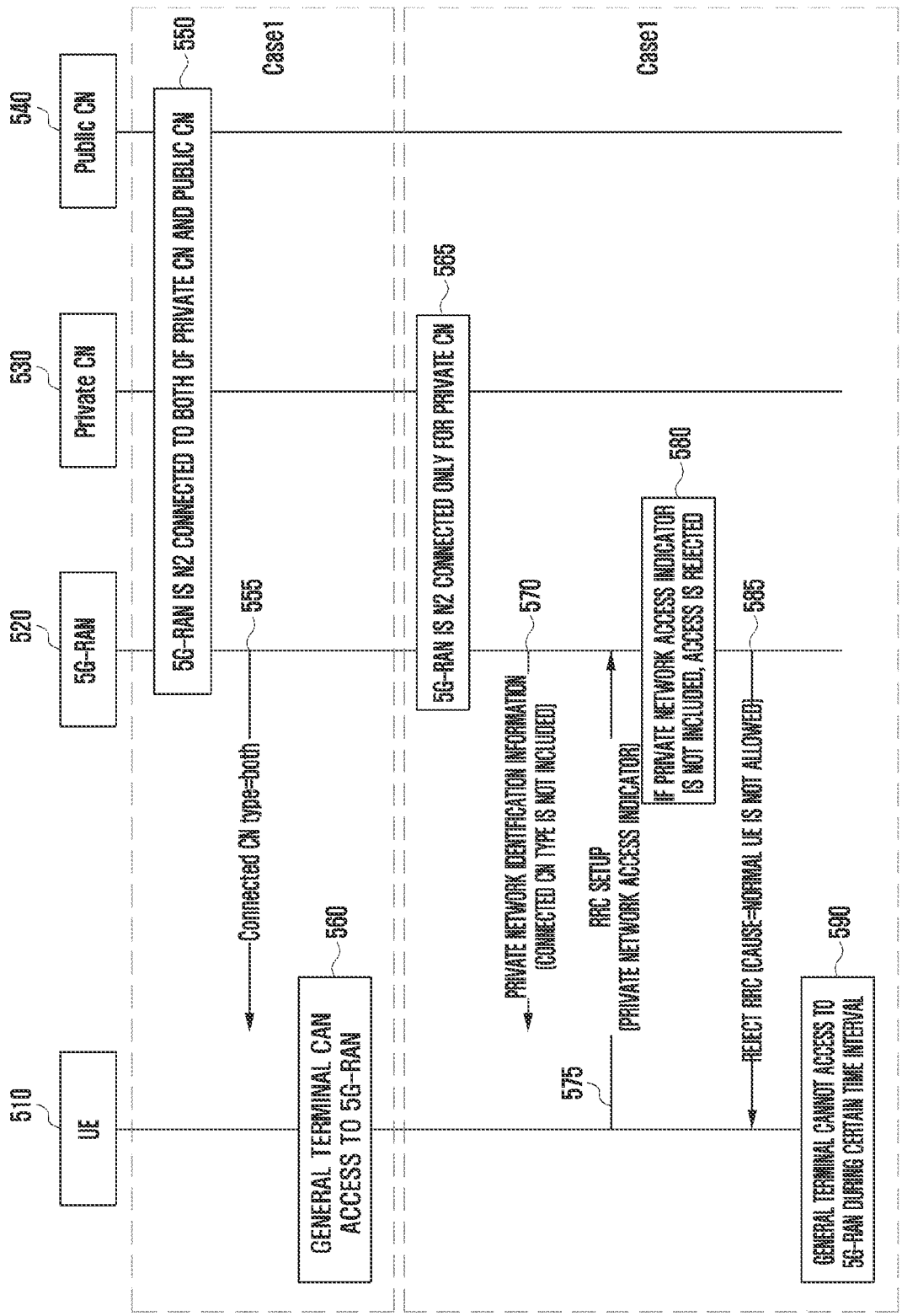
FIG. 5 is a view illustrating a method of restricting access of a terminal accessing a public network through a base station of a private network in connection with a proposed embodiment.

FIG. 5 is a view illustrating a method of restricting access of a general terminal accessing a public network through a base station of a private network in connection with a proposed embodiment.

A base station or a 5G-RAN 520 may be connected to a core network 540 of the public cellular network in addition to a core network 530 of the private cellular network (i.e., RAN sharing scenario). In this case, a general terminal attempting to access the public cellular network 540 may also attempt to access the base station 520. On the other hand, when the base station 520 is connected only to the core network 530 of the private cellular network, the base station should prevent the general terminal accessing the public cellular network 540 from attempting to access the base station 520.

To this end, when the base station 5G-RAN 520 is connected to both the core network 530 of the private cellular network and the core network 540 of the public cellular network (550), the base station 520 may broadcast the SIB message including an indication for indicating that access to both the private network and the public network is possible (555). For example, the base station may broadcast the SIB message by setting the Connected CN type to "both" (555). Alternatively, the base station may broadcast by including identification for each of the public network and the private network, that is, two or more PLMN IDs and two or more PLMN IDs+NIDs in the SIB message. The terminal 510 receiving the SIB message may access the base station 520 even if the base station knows that the base station is a 5G-RAN for a private cellular network, even if a general terminal accessing the public cellular network is known (560).

On the other hand, as in the latter case, when the base station 5G-RAN 520 is connected only to the core network 530 of the private cellular network (565), the base station transmits the SIB message by setting the connected CN type to "private NW only" in addition to the identification information of the private cellular network, or does not include the connected CN type in the SIB message (570).

When the terminal receiving the SIB message accesses to the private cellular network, the terminal includes a private network access indicator indicating access to the private cellular network in the RRC setup message (575). For example, the private network access indicator may be a PLMN ID+NID or NID or PLMN ID+CAG ID or closed access group (CAG) ID or an indication defined for each.

Accordingly, when the base station does not receive the private network access indicator from the terminal, the base station recognizes that a general terminal accessing the public cellular network has been accessed, rejects the RRC setup (580), and sends an RRC reject message to the terminal. In this case, a cause indicating that a general terminal accessing the public cellular network cannot access may be included (585).

The general terminal receiving the reject message does not attempt to access the 5G-RAN for a certain period (590).

Figure 6:
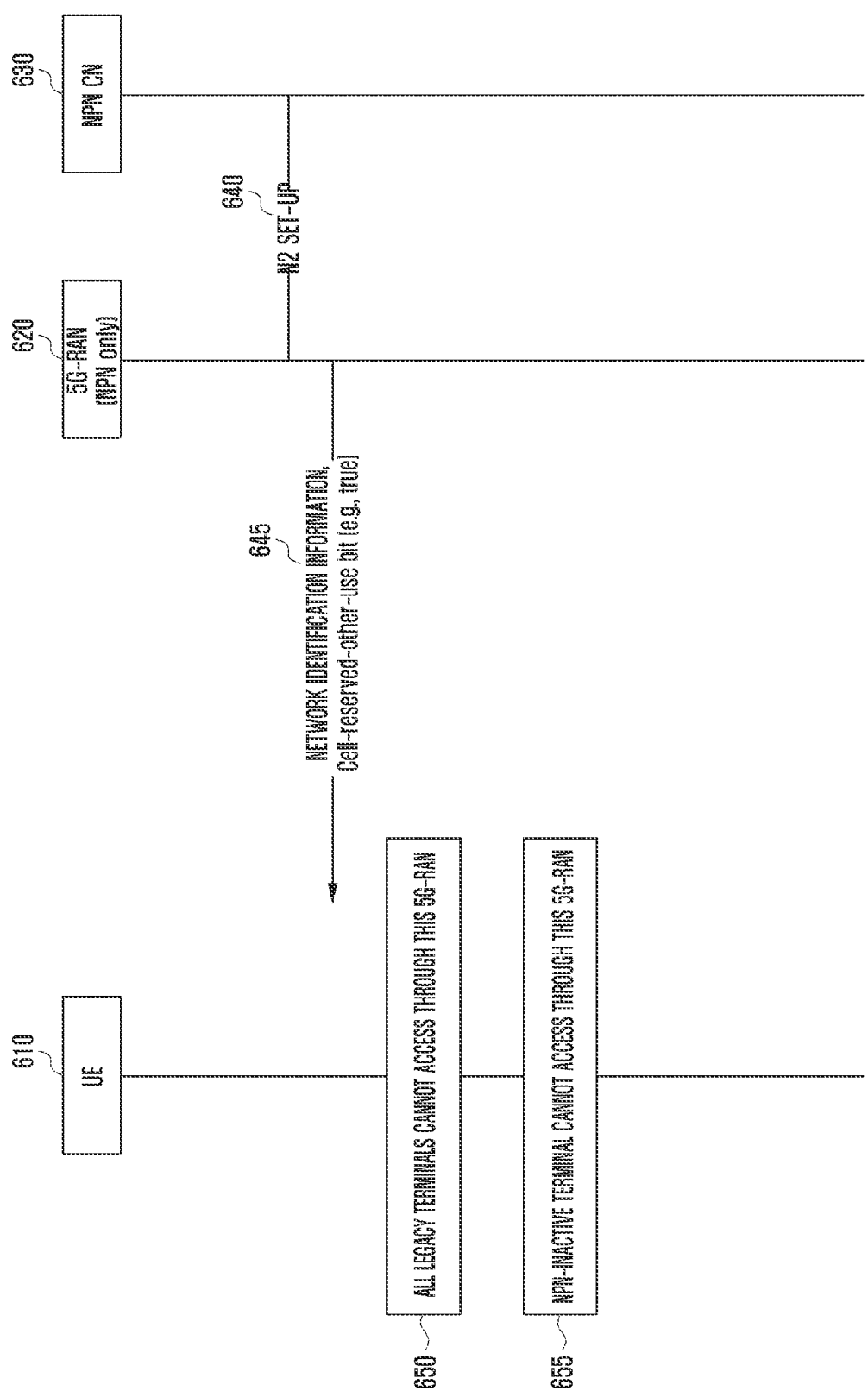
FIG. 6 is a view illustrating a method of restricting access of a terminal to a base station dedicated to a private network in connection with a proposed embodiment.

FIG. 6 is a view illustrating a process of restricting access of a general terminal to a base station dedicated to a private network in connection with another proposed embodiment. When the base station or 5G-RAN 620 is connected to the core network 630 of the private cellular network to establish an N2 connection (640), the base station 620 broadcasts a PLMN ID+network ID (NID) or a PLMN ID+closed access group ID (CAG ID) as network information on the private network in the SIB message (645). In this case, the base station should restrict access to a private network for a legacy terminal or a terminal without a non-public network (NPN) function so that access to the private network is impossible. In this case, the CAG ID is an ID used to indicate that only a terminal having a subscription to the CAG ID can access the network that broadcasts the CAG ID, and is used for the same purpose as the closed subscriber group (CSG) ID used in the LTE system.

Meanwhile, the base station prevents a legacy terminal (e.g., release-15 terminal) or a terminal (e.g., a terminal that does not support the NPN access function even if it is a terminal after release-16) without an NPN function from attempting to access the corresponding base station by including and transmitting a cell-reserved-other-use bit in the SIB message to prevent access of a legacy terminal or a terminal without an NPN function (645). In this case, the cell-reserved-other-use bit received by the terminal 610 is applied to all PLMNs and NPNs serviced by the base station or a cell of the base station, and the base station may transmit, for example, by setting the cell-reserved-other-use bit to true. That is, when the cell-reserved-other-use bit is set to true (or false), the legacy terminal and the terminal without the NPN function do not attempt access to all PLMNs or NPNs served by the base station or cell (650, 655).

Figure 7:
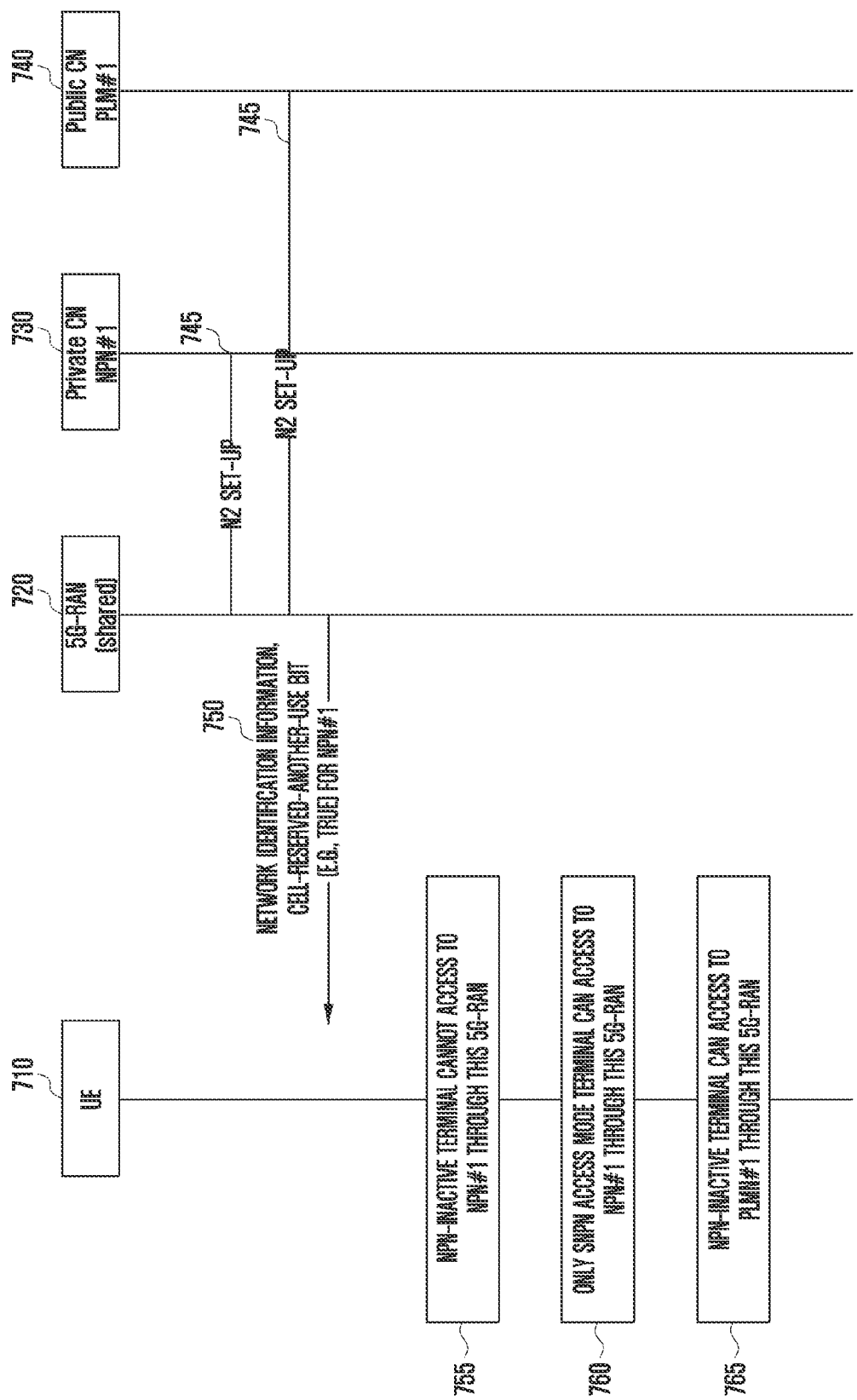
FIG. 7 is a view illustrating a method of controlling access of a terminal to a base station in a shared base station in connection with a proposed embodiment.

FIG. 7 is a view illustrating a method of controlling access of a terminal to a base station in a shared base station in connection with another proposed embodiment.

In the case of shared base stations (720, 745) shared by a private cellular network (i.e., NPN 730) and a PLMN 740 of a public network (i.e., RAN sharing), a legacy terminal or a terminal without an NPN function may attempt to access the base station in order to use the PLMN. However, it is necessary to prevent such terminals from attempting to access a network corresponding to the PLMN ID (e.g., MCC=999, MNC=100) while checking only the PLMN ID (e.g., MCC=999, MNC=100) among the values of the PLMN ID and NID broadcast by the base station for NPN identification.

To this end, the base station 720 may use a method in which a terminal without an NPN function does not attempt to access the base station in order to access a network corresponding to each PLMN ID by including the cell-reserved-another-use bit in the SIB message and transmitting the same for each PLMN ID, PLMN ID+NID, or PLMN ID+CAG ID (750). In this case, the cell-reserved-another-use bit received by the terminal 710 is allocated for each PLMN ID serviced by the base station or for each PLMN ID+NID or for each PLMN ID+CAG ID, and the value is applied for each PLMN or NPN. That is, when the cell-reserved-another-use bit is set to true (or false), the terminal without the NPN function does not attempt to access the corresponding PLMN ID or PLMN ID+NID (755). Alternatively, only a terminal in a standalone NPN (SNPN) connection mode may attempt to access the NPN through the base station according to the value of the cell-reserved-another-use bit (760). Alternatively, it may indicate that the NPN-deactivated terminal is allowed to access the PLMN through the base station according to the cell-reserved-another-use bit value (765).

Figure 8:
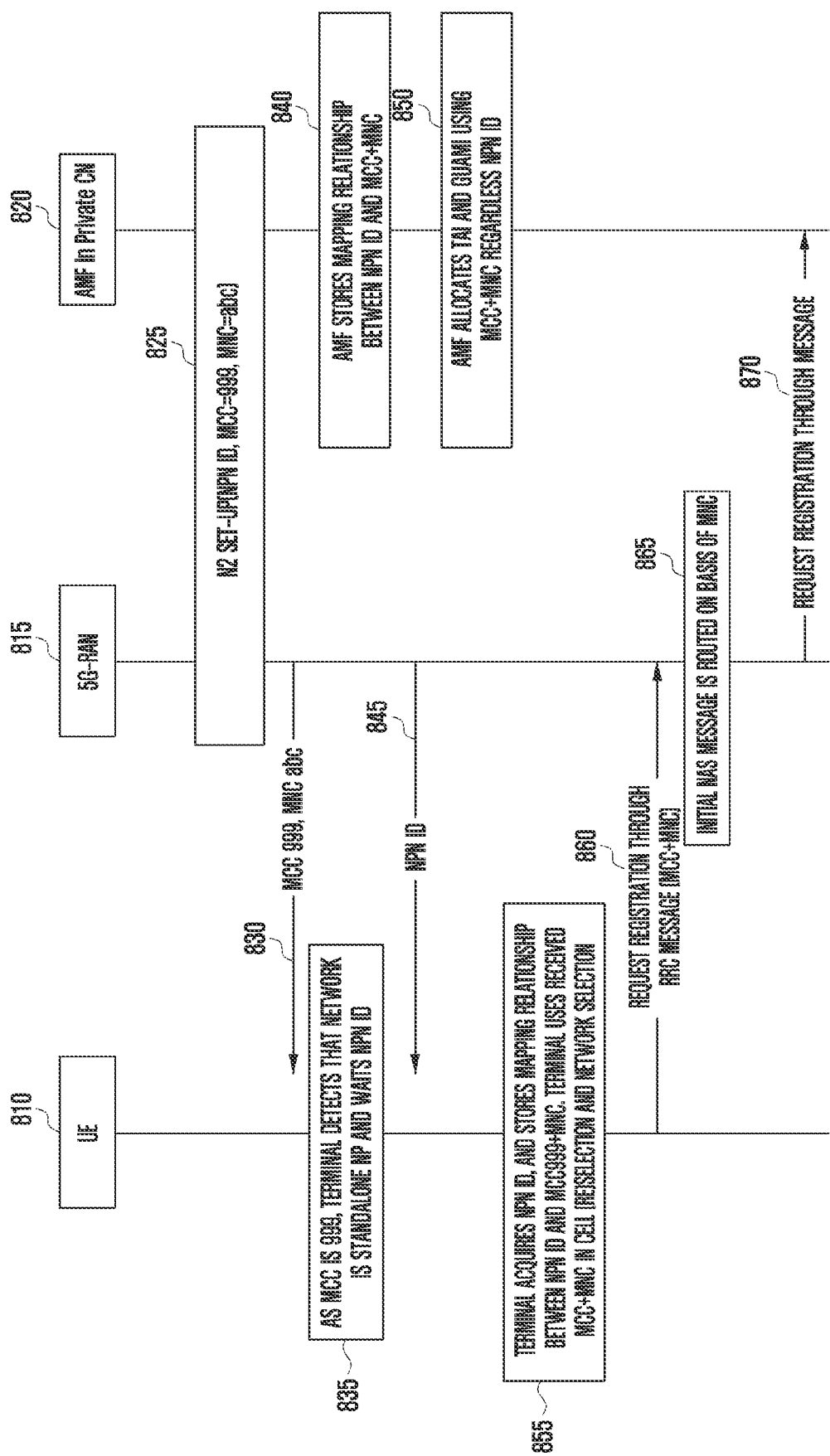
FIG. 8 is a view illustrating an operation of a terminal in which a standalone non-public network is selected in relation to a proposed embodiment.

FIG. 8 is a view illustrating an operation of a terminal that has selected a standalone non-public network in relation to yet another proposed embodiment.

A case is described in which a base station 815 uses a specific MCC value that has not been allocated to a general public cellular network operator as an indication indicating a type B private network, that is, a standalone non-public network. In the process of setting up the N2 connection with the standalone non-public network, the base station 815 transmits the MCC value and the MNC value to be used by mapping with identification for standalone non-public network (e.g., private network ID or non-public network ID (NPN ID)) to the AMF 820 of the standalone non-public network (825). The MCC value, for example, is used as a value of 999, which is a value indicating that the non-public network is, the MNC value is arbitrarily selected by a private network operator as an MNC value that is not used in a nearby non-public network, the value configured by the local regulator is selected for standalone non-public network, or the value derived through the private network ID is selected as the MNC value. For example, a partial value of the private network ID or a hash value of the private network ID may be selected as the MNC value.

In this case, the private network operator selects the MCC value and the MNC value to be used as the same value in all RANs of the standalone non-public network. The AMF 820 of the non-public network stores the mapping of the non-public network ID and the received MCC+MNC value (840), and uses values corresponding to the PLMN ID as the received MCC value and MNC value when allocating globally unique AMF identifier (GUAMI) values or 5G globally unique temporary identifier (GUTI) values (850). In addition, the AMF uses the received MCC value and MNC value as values corresponding to the PLMN ID included in the tracking area identification (TAI) (850).

Meanwhile, the base station 815 broadcasts an MCC value of 999, the selected MNC value, and a non-public network ID supported by the base station through an SIB message (830).

Information broadcasted by the base station may be delivered through different SIB messages. For example, the MCC value 999 and the MNC value abc are delivered in the SIB #1 message (830), and the non-public network ID value may be delivered through another SIB #xx message (845).

When the terminal 810 receives the MCC 999 broadcast by the base station, the terminal 810 recognizes that the corresponding non-public network is a standalone case, and waits for a non-public network ID value broadcast by the base station (835).

When the terminal receiving the MCC 999 already knows the MNC value broadcast by the base station, the terminal might not use the non-public network ID value in performing cell selection and re-selection operations.

As a method for the terminal to know the MNC value broadcast by the base station, a case where the base station obtains the mapping of the non-public network ID and the MCC+MNC value through the value broadcast by the base station previously, a case where the terminal already knows how to obtain the MNC value from the non-public network ID by the base station, or a case where the MCC+MNC value for the non-public network allocated by the local regulator is disclosed and known, etc. may be considered. If the base station supports a standalone non-public network from the MCC and MNC values broadcast as above, and the MCC+MNC value for the non-public network to which the terminal is subscribed is the same, the UE may attempt to register in the non-public network by performing cell selection and network selection procedures without waiting for a non-public network ID value. In this case, the terminal may include the MCC+MNC value received by the terminal in the RRC message 860 and the N2 message 870. In addition, the RRC message 860 and the N2 message 870 include a non-public network ID or a non-public network ID in the registration request message, so that the base station or the AMF may check whether the non-public network to which the terminal intends to access is correct.

The terminal receiving the non-public network ID broadcast after step 835 acquires and stores the mapping of the non-public network ID and the MCC+MNC value (855), and the terminal subscribed to the non-public network performs cell selection, cell reselection, and network selection (855). The terminal selecting the non-public network attempts registration to the network (860). In this case, the terminal includes the MCC+MNC value received by the terminal in the RRC message 860 and the N2 message 870. In addition, the RRC message 860 and the N2 message 870 include a non-public network ID or a non-public network ID in the registration request message, so that the base station or the AMF may check whether the non-public network to which the terminal intends to access is correct.

Upon receiving the registration request message contained in the RRC message 860, the base station forwards the received registration request message to the AMF of the corresponding non-public network by referring to the GUAMI or MCC+MNC value received from the terminal (865).

Figure 9:
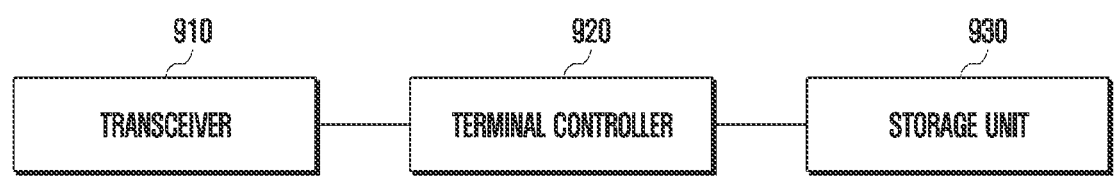
FIG. 9 is a view illustrating a structure of a terminal according to a proposed embodiment.

FIG. 9 is a view illustrating a structure of a terminal according to an embodiment of the disclosure.

Referring to FIG. 9, the terminal may include transceiver 910, a terminal controller 920, and a storage unit 930. In the disclosure, the terminal controller may be defined as a circuit or an application-specific integrated circuit or at least one processor.

The transceiver 910 may transmit and receive signals with other network entities. The transceiver unit may receive system information from, for example, a base station, and may receive a synchronization signal or a reference signal.

The terminal controller 920 may control the overall operation of the terminal according to the embodiment proposed in the disclosure. For example, the terminal controller may control a signal flow between blocks to perform an operation according to the above-described drawings and flow charts. Specifically, the terminal controller may operate to access the network by identifying and selecting a private network.

The storage unit 930 may store at least one of information transmitted and received through the transceiver and information generated through the terminal controller.

Figure 10:
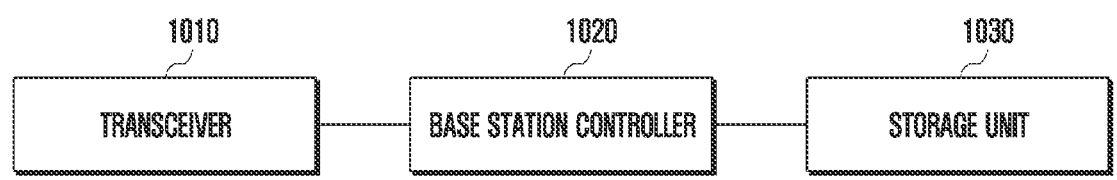
FIG. 10 is a view illustrating a structure of a base station according to a proposed embodiment.

FIG. 10 is a view illustrating a structure of a base station according to an embodiment of the disclosure.

Referring to FIG. 10, the base station may include a transceiver 1010, a base station controller 1020, and a storage unit 1030. In the disclosure, the base station controller may be defined as a circuit or an application-specific integrated circuit or at least one processor.

The transceiver 1010 may transmit and receive signals with other network entities. The transceiver may transmit system information to the terminal, for example, and may transmit a synchronization signal or a reference signal.

The base station controller 1020 may control the overall operation of the base station according to the embodiment proposed in the disclosure. For example, the base station controller may control a signal flow between blocks to perform operations according to the above-described drawings and flow charts. Specifically, the base station controller may transmit the SIB message including information for controlling whether the terminal is connected according to the type of the cellular network to which the base station is connected.

The storage unit 1030 may store at least one of information transmitted and received through a transceiver and information generated through a base station controller.

The embodiments of the disclosure described and shown in the specification and the drawings have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

The invention claimed is:

1. A method performed by a base station connected to a non-public network in a wireless communication system, the method comprising:
generating a system information block (SIB) including cell access related information, wherein the cell access related information comprises first information on one or more public land mobile network (PLMN) identities (IDs), second information on a network identifier (NID), and third information indicating whether a cell is reserved; and
transmitting, to a terminal, the SIB,
wherein the non-public network is indicated based on combination of a PLMN ID and the NID, and
wherein the third information is configured to indicate that the cell is reserved, to prevent a terminal not supporting the non-public network from accessing the cell associated with the non-public network.

2. The method of claim 1, wherein the third information is configured as "true" to prevent the terminal not supporting the non-public network from accessing the cell associated with the non-public network.

3. The method of claim 1,
wherein the third information is a parameter expressed by 'cellreservedforotheruse', and
wherein the third information is common for all PLMNs.

4. The method of claim 1, wherein a mobile country code (MCC) associated with the PLMN ID for identifying the non-public network is assigned as 999.

5. The method of claim 1, wherein the SIB is broadcasted.

6. A base station connected to a non-public network in a wireless communication system, the base station comprising:
a transceiver configured to transmit and receive a signal; and
a controller coupled with the transceiver and configured to:
generate a system information block (SIB) including cell access related information, wherein the cell access related information comprises first information on one or more public land mobile network (PLMN) identities (IDs), second information on a network identifier (NID), and third information indicating whether a cell is reserved, and
transmit, to a terminal, the SIB,
wherein the non-public network is indicated based on combination of a PLMN ID and the NID, and
wherein the third information is configured to indicate that the cell is reserved, to prevent a terminal not supporting the non-public network from accessing the cell associated with the non-public network.

7. The base station of claim 6, wherein the third information is configured as "true" to prevent the terminal not supporting the non-public network from accessing the cell associated with the non-public network.

8. The base station of claim 6, wherein the third information is a parameter expressed by 'cellreservedforotheruse', and
wherein the third information is common for all PLMNs.

9. The base station of claim 6, wherein a mobile country code (MCC) associated with the PLMN ID for identifying the non-public network is assigned as 999.

10. A method performed by a terminal in a wireless communication system, the method comprising:
receiving, from a base station connected to a non-public network, a system information block (SIB) including cell access related information, wherein the cell access related information comprises first information on one or more public land mobile network (PLMN) identities (IDs), second information on a network identifier (NID), and third information indicating whether a cell is reserved;
identifying whether the terminal supports to access to the non-public network; and
in case that the terminal does not support to access to the non-public network and the third information indicates that the cell associated with the non-public network is reserved, determining that accessing to the cell associated with the non-public network is barred,
wherein the non-public network is identified based on combination of a PLMN ID and the NID.

11. The method of claim 10,
wherein the third information is configured as "true" to prevent the terminal not supporting the non-public network from accessing the cell associated with the non-public network, and
wherein the third information is common for all PLMNs.

12. The method of claim 10, wherein a mobile country code (MCC) associated with the PLMN ID for identifying the non-public network is assigned as 999.

13. The method of claim 10, further comprising:
in case that the terminal supports to access to the non-public network, accessing to the cell associated with the non-public network identified based on combination of a PLMN ID and the NID.

14. A terminal in a wireless communication system, the terminal comprising:
a transceiver configured to transmit and receive a signal; and
a controller coupled with the transceiver and configured to:
receive, from a base station connected to a non-public network, a system information block (SIB) including cell access related information, wherein the cell access related information comprises first information on one or more public land mobile network (PLMN) identities (IDs), second information on a network, identifier (NID), and third information indicating whether a cell is reserved,
identify whether the terminal supports to access to the non-public network, and
in case that the terminal does not support to access to the non-public network and the third information indicates that the cell associated with the non-public network is reserved, determine that accessing to the cell associated with the non-public network is barred,
wherein the non-public network is identified based on combination of a PLMN ID and the NID.

15. The terminal of claim 14, wherein the third information is configured as "true" to prevent the terminal not supporting the non-public network from accessing the cell associated with the non-public network.

16. The terminal of claim 14, wherein the third information is a parameter expressed by 'cellreservedforotheruse', and
wherein the third information is common for all PLMNs.

17. The terminal of claim 14, wherein the second information includes PLMN ID and NID for the private network, and
wherein a mobile country code (MCC) associated with the PLMN ID for identifying the non-public network is assigned as 999.

* * * * *